United States Patent [19]
Lizell

[11] Patent Number: 5,398,788
[45] Date of Patent: Mar. 21, 1995

[54] USE OF A DISPLACEMENT MACHINE AS A PRESSURE CONTROL VALVE

[76] Inventor: Magnus Lizell, Bjorns Backe 2, Danderyd, Sweden

[21] Appl. No.: 987,265
[22] PCT Filed: Sep. 6, 1991
[86] PCT No.: PCT/SE91/00588
§ 371 Date: Mar. 8, 1993
§ 102(e) Date: May 17, 1993
[87] PCT Pub. No.: WO92/04198
PCT Pub. Date: Mar. 19, 1992

[30] Foreign Application Priority Data
Sep. 7, 1990 [SE] Sweden ............................ 9002865

[51] Int. Cl.⁶ ...................... B60G 13/08; F16F 11/00
[52] U.S. Cl. .......................... 188/322.15; 188/299; 188/317
[58] Field of Search ............... 188/271, 280, 281, 282, 188/272, 279, 299, 317, 318, 322.15; 418/197, 201.2

[56] References Cited

U.S. PATENT DOCUMENTS

| | | |
|---|---|---|
| 1,952,902 | 3/1934 | Barros . |
| 3,746,049 | 7/1973 | O'Connor, Jr. ............... 137/802 |
| 3,966,371 | 6/1976 | Berzanske ................. 418/197 |
| 4,241,814 | 12/1980 | Masclet ..................... 188/266 |
| 4,732,408 | 3/1988 | Öhlin ...................... 188/299 X |
| 4,776,779 | 10/1988 | Crump ...................... 418/197 |
| 4,893,699 | 1/1990 | Engelsdorf et al. ............. 188/299 |
| 4,964,790 | 10/1990 | Scott ................... 418/201.2 X |
| 5,090,525 | 2/1992 | Öhlin ....................... 188/319 |
| 5,275,205 | 1/1994 | Bauer ....................... 137/596 |

FOREIGN PATENT DOCUMENTS

| | | |
|---|---|---|
| 2440078 | 11/1975 | Germany . |
| 2629816 | 1/1978 | Germany . |
| 4135526 | 4/1992 | Germany ................. 188/299 |

*Primary Examiner*—Robert J. Oberleitner
*Assistant Examiner*—Peter M. Poon
*Attorney, Agent, or Firm*—Pollock, Vande Sande & Priddy

[57] ABSTRACT

A valve for controlling a liquid in an hydraulic vehicle shock absorber includes a displacement machine mounted within a passageway in a piston moveable in a cylinder of the shock absorber. The displacement machine includes at least one operative body rotatable by flow of the liquid. A brake is provided for braking the movement of the rotatable body of the displacement machine thereby causes a reduction in the flow velocity of the liquid passing through the valve and a desired damping force. The brake is actuated by an actuating unit.

15 Claims, 2 Drawing Sheets

USE OF A DISPLACEMENT MACHINE AS A PRESSURE CONTROL VALVE

FIELD OF THE INVENTION

The present invention refers to the use of a displacement machine known a pressure control valve.

BACKGROUND OF THE INVENTION

The control of the flow of a liquid usually is gained by restricting the flow in a restriction in some kind of valve, usually a seat slide valve. In such valves it is required, however, a very small area change for providing a very great change of the pressure drop, is the pressure drop varies exponentially with the change of the position of the valve body. When slightly opening seat valves the flow velocity becomes very high and the liquid pressure locally becomes so low that the liquid tends to be vaporized, giving rise to cavitation. In order to avoid this it would be desirable to provide a control device operating, if possible, in an entirely proportional manner.

For the control of flows the use of rotary-dynamic machines is previously known in various connections. Thus, in U.S. Pat. No. 3,709,245 a control valve is disclosed in which a rotor is brought to rotate by means of a whirling rotation of a fluid flow. Energy then can be tapped from the rotor in various ways, for example by the generation of electric current or the like. Due to the inherent characteristics of the rotary-dynamic machines they are, however, not suited for a more exact control of a fluid flow and particularly the pressure thereof.

Displacement machines also have been used as flow meters. Such flow meters also have been used such that the output controls a valve or the like for providing a flow control, see DE-A-2 440 078. Furthermore, it is also known to use a displacement machine having a rotary member mounted in a liquid conduit for controlling the flow and/or the pressure of the liquid by braking the rotary member. In this respect it might be referred to; for example, DE-B-2 840 134, DE-A-3 210 098, FR-A-2 380 585 and U.S. Pat. No. 4,815,278.

Quite surprisingly it has now been found that a particular use of a displacement machine as a pressure control valve in connection with motor vehicle shock absorbers allows the achievement of unexpected advantages hitherto not obtainable with known shock absorber valve structures.

SUMMARY OF THE INVENTION

The main object of the present invention thus is to suggest the use of a known displacement machine as a pressure control valve for the liquid in a vehicle shock absorber in order to provide a direct proportional pressure control and hence a desired damping force of the latter, the displacement machine being mounted within the piston of the cylinder together with associated actuation means operable from the outside of the cylinder in response to a pressure sensor inside the cylinder.

With the present invention a very desirable and entirely proportional control action thus can be obtained by applying a braking action on the rotary member of the displacement machine mounted within the piston. This manner of controlling the liquid pressure is of particular advantage in connection with motor vehicle shock absorbers.

In a preferred embodiment of the present invention the displacement machine is a screw pump, particularly of so-called IMO-type. By the use of such a screw pump it can be obtained a pressure control which is proportional to the braking momentum exerted on the rotary member of the machine. This implies that the control action becomes independent of the viscosity of the fluid or liquid and the great equivalent flow area eliminates the risks of cavitation. However, the present invention also might be advantageously used in connection with other kinds of hydraulic cylinders.

It is also to be mentioned that in known displacement machines of screw-type which are used as flow or volume meters the rotary members have no output shaft but the rotary speed is registered by, for example, an inductive sensor. When using the displacement machine for the control of the pressure of a liquid according to the present invention the machine now also includes braking means and a pressure sensor for setting the pressure to a desired value. The invention also might be applied in hydraulic systems in which a common servo valve or a direct-controlled valve can be substituted with a control by means of a displacement machine according to the present invention.

BRIEF DESCRIPTION OF THE DRAWINGS

By way of example the invention will be further described below with reference to the accompanying drawing in which.

DETAILED DESCRIPTION OF THE PREFERRED EMBODIMENT

Figure 1:
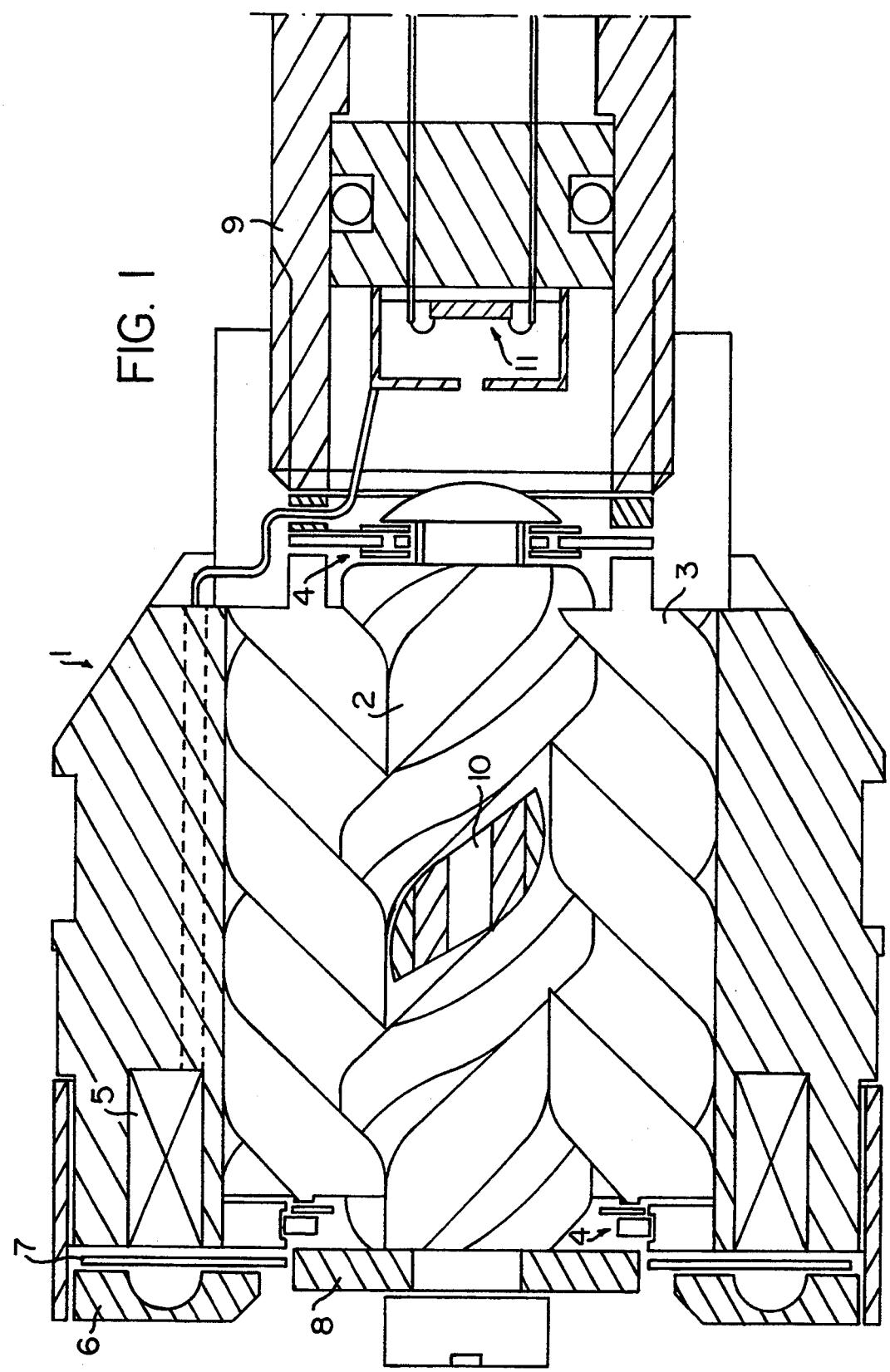
FIG. 1 is a longitudinal section of a displacement machine of screw-type for the use according to the invention, as seen in a plane containing the axis of rotation of the screws.

The displacement machine for pressure control illustrated in FIG. 1 is mounted within a piston 1 of a hydraulic cylinder such as a vehicle shock absorber of telescope type, not further illustrated. In this case the screw pump is of well-known type having three screws, namely a central screw 2 and two idle screws 3 laterally thereof. The idle screws of the pump are journalled at each end in axial bearings 4 as known.

At its end remote from the piston rod 9 the piston according to the invention is provided with suitable braking means, in the present case of electromagnetic type and comprising a circumferential electric coil 5 inserted into the piston 1 and an annular metal pressure disc 6 located axially beyond the coil and therebetween a brake disc 7 connected with an entraining member 8 secured to the central screw of the displacement machine. Through conductors not further illustrated the coil 5 can be excited, due to which the pressure disc 6 urges the brake disc 7 to a desired extent towards the end surface of piston 1 and hence applies a braking momentum onto the drive screw 2 such that the pressure drop through the machine increases (or the liquid flow decreases). The liquid pressure drop over the screw then is proportional to the braking momentum which in turn is proportional to the current in the coil 5.

Suitably the central screw 2 is provided with a central longitudinal bore 10 for carrying the liquid pressure beyond the end of the piston to a pressure sensor 11 mounted in the piston rod 9. The output of the pressure sensor then passes through the piston rod 9 and outwardly outside the shock absorber and to a preferably electronic control device. Preferably the axial bearing at the end of the screw facing the piston rod 9 is made double-acting and furthermore such that it seals the space at the pressure sensor 11 from the adjacent screw end. By suitable dimensioning of the areas it can thereby be provided an axial pressure equilibrium over the central screw.

In shock absorbers the present invention can provide an active motion damping in wheel suspensions which for isolating vibrations require a rapid-acting and easily controllable valve. The same also applies to various machine supports.

Above it has been described a kind of electromagnetic friction brake for braking of the displacement machine and thus achieving the desired control action. To the artisan it is obvious, however, that for the same purpose and with only minor design changes a known eddy current brake might be used but also an electric generator circuit.

Figure 2A:
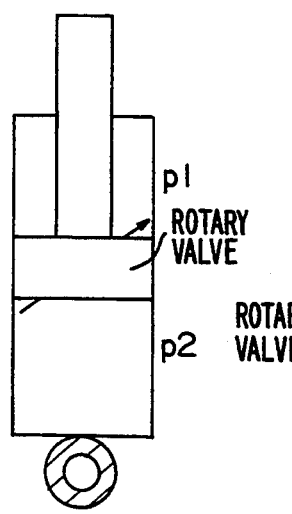
FIGS. 2a, 2b and 2c diagrammatically illustrate various application examples of the present invention in a shock absorber with variable restriction, a hydraulic cylinder having internal variable damping and a single-acting hydraulic cylinder having internal damping, respectively.
Figure 2B:
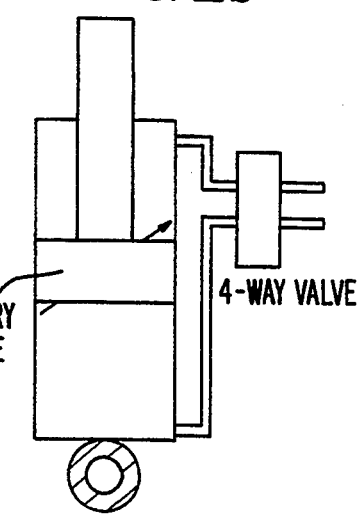
Figure 2C:
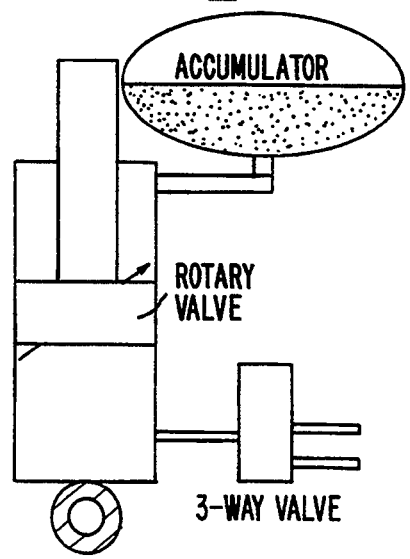

In FIG. 2 have been illustrated diagrammatical views of further applications of the present invention. In FIG. 2a thus is disclosed a shock absorber having variable restriction while in FIG. 2b has been diagrammatically illustrated a hydraulic cylinder with variable internal restriction, in which the displacement machine can allow the hydraulic liquid to be carried between the spaces at either side of the piston and thus eliminating the necessity of having an external hydraulic source. In FIG. 2c, finally, has been illustrated a single-acting hydraulic cylinder having internal damping.

Figure 3:
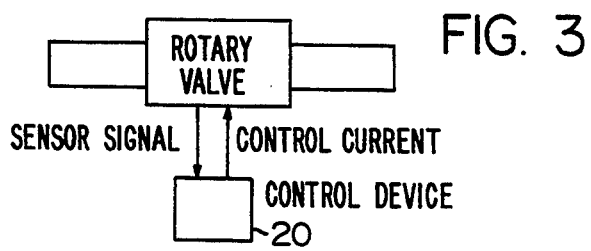
FIGS. 3 and 4 diagrammatically illustrate further embodiments of the invention.
Figure 4:
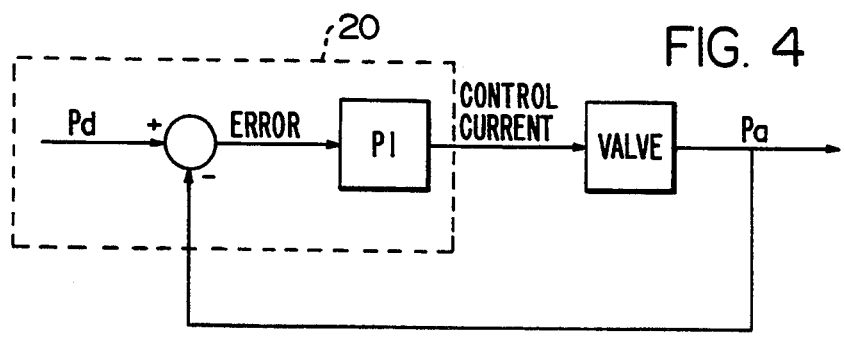

Finally, in FIGS. 3 and 4 have been diagrammatically illustrated various further application possibilities of the present invention. FIG. 3 shows the application in pressure control in common (or flow control). Pressure or rotary speed are measured and processed by the control device 20 which in turn acts upon for example, the current to the brake member such as the coil 5. FIG. 4 discloses pressure control with feed-back of real pressure. It is also an inherent characteristic of the displacement machine that in the present connection the same also might be used for measuring or metered discharge of the liquid quantity, in which only the number of revolutions of the rotary machine part (the central screw) needs to be determined.

Within the scope of the present invention also other types of displacement machines might be used, such as gear pumps but due to the greater initial starting inertia thereof than in machines of screw-type they are less suitable for satisfying the objects of the present invention.

In general the brake-equipped displacement machine according to the invention used as valve might be incorporated in pistons in most kinds of hydraulic mechanisms.

I claim:

1. A pressure control valve and shock absorber combination for controlling a liquid flow in a hydraulic shock absorber, the pressure control valve comprising:
   a displacement machine mounted within a passageway of a piston moveable in a cylinder of the shock absorber, the displacement machine comprising at least one operative body rotatable by flow of the liquid;
   a brake for braking the movement of said rotatable body of the displacement machine to reduce the flow velocity of the liquid passing through the valve; and
   means for actuating the brake.

2. A pressure control valve and shock absorber combination according to claim 1, further comprising a pressure sensor located inside the cylinder and sending signals to said brake actuating means.

3. A pressure control valve and shock absorber combination according to claim 1, wherein the brake is operable from outside the cylinder.

4. A pressure control valve and shock absorber combination according to claim 1, wherein the displacement machine is a screw pump.

5. A pressure control valve and shock absorber combination according to claim 4, wherein the screw pump comprises a central screw, including a central longitudinal bore, and two idle screws located on opposite sides adjacent the central screw.

6. A pressure control valve and shock absorber combination according to claim 4, wherein the brake comprises an electromagnetic brake.

7. A pressure control valve and shock absorber combination according to claim 4, wherein the electromagnetic brake comprises an electromagnetic coil, an annular metal disk located within the piston, an annular metal pressure disk located within the piston axially beyond the coil, and a brake disk located within the piston between the coil and the pressure disk, wherein when the electromagnetic coil is excited, the pressure disc urges the brake disk toward an inside surface of the piston thereby applying a braking momentum onto the central screw of the screw pump increasing a pressure drop through the central screw proportionally to the braking momentum which is proportional to the current in the coil.

8. A pressure control valve and shock absorber combination according to claim 4, wherein the brake comprises an eddy current brake.

9. A pressure control valve and shock absorber combination according to claim 4, wherein the brake comprises an electric generator circuit.

10. A hydraulic shock absorber, comprising:
    a cylinder housing;
    a working fluid contained within the shock absorber;
    a piston movable within said cylinder and provided with at least one passageway therethrough for flow of the fluid;
    a valve apparatus arranged within the passageway for controlling the fluid flow, the valve apparatus comprising a positive displacement machine including at least one operative body rotated by the fluid flow; and
    means for braking the motion of the at least one operative body, to create a desired damping force on the fluid flow.

11. A hydraulic shock absorber according to claim 10, further comprising means for actuating the braking means.

12. A hydraulic shock absorber according to claim 10, wherein the displacement machine is a screw pump.

13. A hydraulic shock absorber according to claim 12, wherein the screw pump comprises a central screw, the central screw including a central longitudinal bore, and two idle screws located on opposite sides adjacent the central screw.

14. A hydraulic shock absorber according to claim 10, wherein the braking means comprises an electromagnetic brake.

15. A method of controlling fluid flow in a hydraulic shock absorber to provide a direct proportional pressure control and a desired damping force, the method comprising the steps of:

mounting a valve comprising a displacement machine including at least one operative body rotatable by the flow of the fluid within a piston of a cylinder of the shock absorber;

actuating means for braking the movement of the rotatable body of the displacement machine in response to a pressure sensed by a pressure sensor located inside the cylinder to reduce the flow velocity of the fluid passing through the valve.

* * * * *